Feb. 17, 1931.  K. L. HERRMANN  1,793,229
BRAKE
Filed May 28, 1928
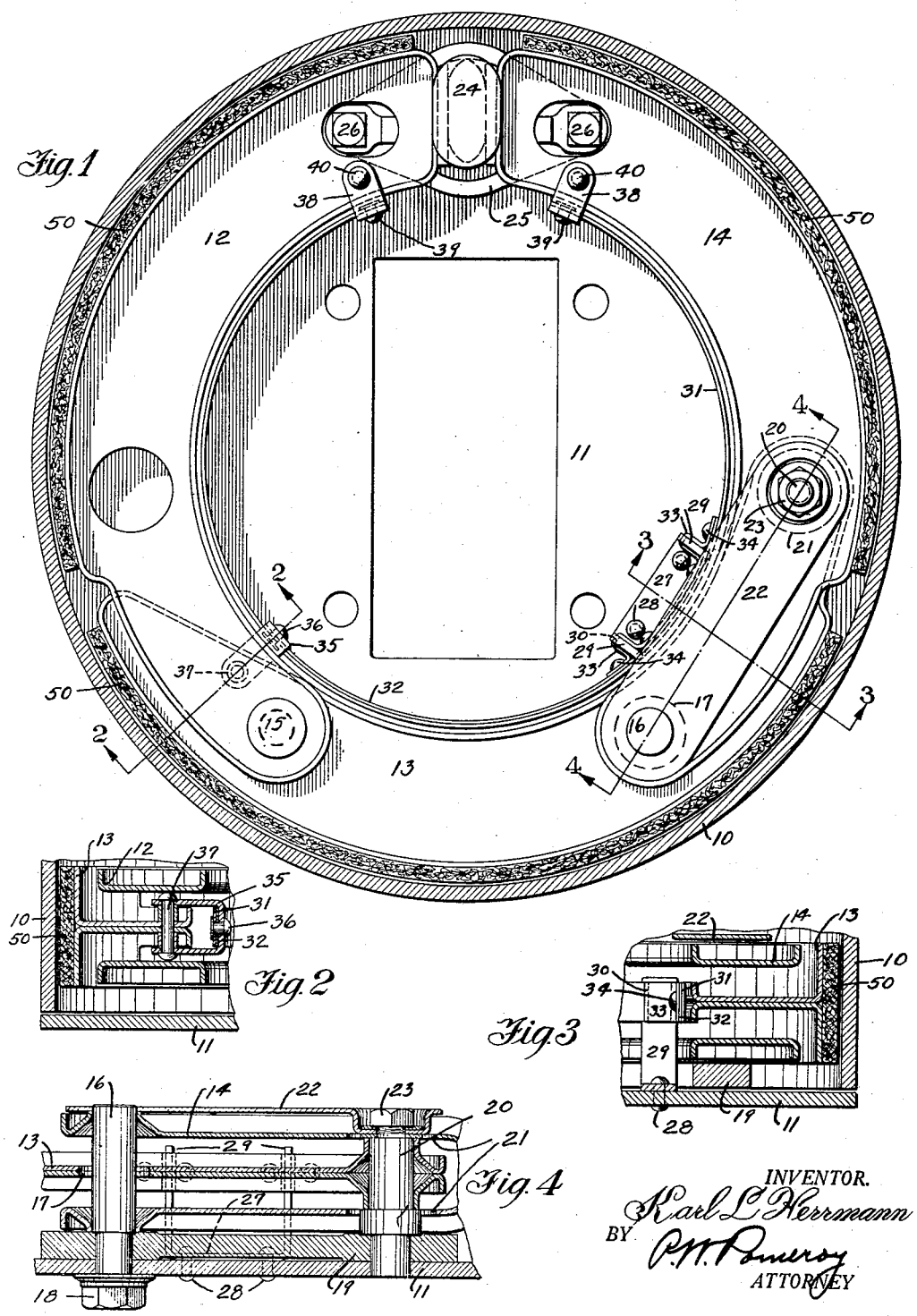
INVENTOR.
Karl L. Herrmann
BY P. W. Pomeroy
ATTORNEY Patented Feb. 17, 1931

1,793,229

UNITED STATES PATENT OFFICE

KARL L. HERRMANN, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed May 28, 1928. Serial No. 281,116.

This invention relates to vehicle brakes and particularly to brakes of the internal expanding type, the principal object being to provide a brake of this type with a single means for normally holding the brake elements in inoperative position and for returning the same to this position from operative position.

Another object is to provide a vehicle brake of the internal expanding type with a split circular spring for normally holding the brake elements in inoperative position.

Another object is to provide a vehicle brake of the internal expanding type having shoes, with a single spring means for holding the shoes in normal inoperative position.

A further object is to provide a vehicle brake of the internal expanding type having three shoes, with a split circular spring of rectangular cross section connected to each of the shoes for returning the same from operative position to normal inoperative position.

These being among the objects of the present invention the same consists of certain features of construction and combinations of parts to be hereinafter described with reference to the accompanying drawing, and then claimed, having the above and other objects in view.

In the accompanying drawing which illustrates a suitable embodiment of the present invention, Figure 1 is a section through a vehicle brake taken just inside the head of the brake drum thereof showing the brake element and operating mechanism therefor in elevation.

Figure 2 is a section taken on the line 2—2 of Figure 1.

Figure 3 is a section taken on the line 3—3 of Figure 1.

Figure 4 is a section taken on the line 4—4 of Figure 1 showing the method of anchoring the brake shoes.

Referring to the accompanying drawing in which like numerals refer to like parts throughout the several views, the brake chosen for illustration is one which can be used on the front wheels as well as on the rear wheels of a motor vehicle. Hence, the complete brake assembly is shown in Figure 1 in its entirety ready to be assembled to a vehicle wheel.

The brake drum 10 is rigidly secured to a vehicle wheel (not shown) and a backing plate 11 is positioned adjacent to the open side thereof to exclude as much dirt and foreign particles as possible from the brake mechanism, and is suitably secured to the wheel steering knuckle (not shown) or rear axle housing (not shown).

The brake element which is positioned concentrically within the brake drum 10 is of the servo or self-energizing type and comprises primary, secondary and reverse shoes 12, 13 and 14 respectively, each being covered with a facing of suitable friction material 50. As shown in Figures 1 and 2, the primary shoe 12 has a bifurcated end which telescopically receives one end of the secondary shoe 13 and is hinged thereto by means of an articulating pin 15. One end of the reverse shoe 14 is also bifurcated and likewise telescopically receives the other end of the secondary shoe 13 but is not pivoted thereto as in the case of the primary shoe 12. This end of the reverse shoe 14 is pivoted to an anchor pin 16 which extends through an enlarged opening 17 in the web of the secondary shoe 13 and is secured to the backing plate 11 by a nut 18 threaded thereon, a reinforcing plate 19 being welded or otherwise secured to the backing plate 11 at this point to strengthen the same. A shouldered pin 20 is mounted on the reinforcing plate 19 by means of a press fit and extends through enlarged openings 21 in the web of the reverse shoe 14 adjacent to the bifurcated end thereof. The end of the secondary shoe 13 received within the bifurcated end of the reverse shoe 14 is pivoted to this anchor pin 20 and both shoes 13 and 14 are held against transverse movement on their respective anchor pins 20 and 16 by means of a retaining plate 22 as shown in Figure 4. The retaining plate 22 is provided with openings at its ends which are received by the anchor pins and a nut 23 threaded on the anchor pin 20 holds the same in place. The enlarged opening 17 in the web of the secondary shoe 13 allows the shoe to pivot about its anchor pin 20 and the enlarged openings 21 in the web of the reverse shoe 14 allows the same to pivot about its anchor pin 20.

The free ends of the primary shoe 12 and reverse shoe 14 abut against opposite sides of an operating cam 24 which is rotatably journaled in a bracket 25 secured to the backing plate 11 by suitable bolts 26. Rotation of the cam 24 moves the brake shoes to engage the brake drum 10.

Vehicle brakes of this type used in the past employ a multiplicity of coil springs to normally hold the brake shoes in inoperative position out of engagement with the brake drum 10 and to draw the same to this normal position after engagement with the brake drum 10. The present invention eliminates the necessity of this multiplicity of springs which often fatigue and break and employs a single means which extends substantially the inner circumference of the brake shoes to normally maintain them in inoperative position.

A pressed metal U-shaped bracket 27 is secured by rivets 28 or other suitable means to the backing plate 11 midway between and adjacent to the anchor pins 16 and 20. The arms 29 of the bracket 27 extend perpendicular to the backing plate 11 and are preferably notched at 30 as shown in Figures 1 and 3. A split circular band 31 of flat spring steel is positioned within the inner circumference of the brake element and is provided with a reinforcing strip 32 for a portion of its length adjacent to the secondary shoe 13. U-shaped clips 33 seated in the notches 30 are secured by rivets 34 or other suitable means to the band 31 to securely mount the same on the bracket 27. As shown in Figures 1 and 2 a U-shaped clip 35 straddles the band 31 and is secured thereto by a rivet 36. The legs of this clip 36 straddle the web of the secondary shoe 13 and are secured thereto by a long rivet 37. Similar clips 38 are secured by rivets 39 to the extreme ends of the band 31 and are connected by rivets 40 to the shoes 12 and 14 adjacent to the free ends thereof.

The band 31 being of spring steel is sufficiently resilient so that normally it holds the three brake shoes 12, 13 and 14 out of engagement with the brake drum 10 and also holds the free ends of the shoes 12 and 14 in contact with the opposite sides of the operating cam 24. When the operating cam 24 is rotated, the shoes 12 and 14 move on their pivot pins 15 and 16 respectively to engage the brake drum 10. The primary shoe 12 as soon as it engages the drum 10 rotates therewith exerting a force on the articulating pin 15 which causes the secondary shoe 13 to pivot about is anchor pin 20 to engage the drum. When the cam 24 is allowed to return to its normal position, the resilient band 31 with the aid of the reinforcing band 32 tends to assume its normal circular position and thereby by means of the clips 35 and 38 draws the shoes 13, 12 and 14 to their normal positions out of engagement with the brake drum 10.

It is readily apparent from the drawing and foregoing description that the present invention is very adaptable for brakes of the class described and that it is very simple in construction and economical to manufacture.

It is to be understood however, that formal changes may be made in the specific embodiment of the invention described without departing from the spirit and substance of the broad invention, the scope of which is commensurate with the appended claims.

What I claim is:

1. In a vehicle brake having at least three brake elements, a circular resilient band spaced inwardly of said brake elements having a connection with each of said elements for holding said elements in normal inoperative position.

2. In a vehicle brake, a rotatable drum, a backing plate adjacent to the open end thereof, a plurality of brake elements engageable with said drum, and a split resilient band supported by said backing plate positioned out of contact with said brake elements, and means connecting said band with said brake elements for normally holding said elements out of engagement with said drum.

3. In a vehicle brake, a rotatable drum, a backing plate adjacent to the open end thereof, reverse and secondary shoes pivoted to said backing plate, a primary shoe pivoted to said secondary shoe, and a single spring means supported by said backing plate for normally holding said shoes out of engagement with said drum.

4. In a vehicle brake, a rotatable drum, a backing plate adjacent to the open end thereof, reverse and secondary shoes pivotally mounted on said backing plate, a primary shoe pivoted to said secondary shoe, and a split resilient band mounted on said backing plate and connected with each of said shoes for normally holding all of said shoes out of engagement with said drum.

5. In a vehicle brake, a rotatable drum, a backing plate adjacent to the open end thereof, reverse and secondary shoes pivotally mounted on said backing plate, a primary shoe pivoted to said secondary shoe, a split resilient band mounted on said backing plate, a U-shaped member secured to said band intermediate its ends and to the free end of said secondary shoe, and U-shaped members secured to said band at its ends and to the free ends of said primary and reverse shoes whereby said band normally holds all of said shoes out of engagement with said drum.

6. In a vehicle brake, a rotatable drum, a backing plate adjacent to the open end thereof, reverse and secondary shoes pivotally mounted on said backing plate, a primary shoe pivoted to said secondary shoe, a U- shaped support secured to said backing plate, and a split resilient band secured to the projecting legs of said support, said band being connected to each of said shoes whereby said shoes are normally held out of engagement with said drum.

7. In a vehicle brake, a rotatable drum, a backing plate adjacent to the open end thereof, reverse and secondary shoes pivotally mounted on said backing plate, a primary shoe pivoted to said secondary shoe, a split resilient band of spring metal having a connection with each of said shoes, a U-shaped support secured to said backing plate having notches in the legs thereof, and U-shaped members seated in said notches and secured to said band, whereby said shoes are normally held out of engagement with said drum.

8. In a vehicle brake, a rotatable drum, a backing plate adjacent to the open end thereof, reverse and secondary shoes pivotally mounted on said backing plate, a primary shoe pivoted to said secondary shoe, a split resilient band of spring metal supported by said backing plate and having a connection with each of said shoes, and an arcuate resilient reinforcing strip of spring metal secured to said band in the vicinity of said secondary shoe, whereby said band and reinforcing strip holds all of said shoes in normal inoperative position.

Signed by me at South Bend, Indiana, this 25th day of May, 1928.

KARL L. HERRMANN.